United States Patent [19]
Persson et al.

[11] Patent Number: 5,470,634
[45] Date of Patent: Nov. 28, 1995

[54] COVER FOR AIR-BAG INSTALLATION

[75] Inventors: Dan Persson; Jonas Malmenstam, both of Alingsas, Sweden

[73] Assignee: Autoliv Development AB, Vargarda, Sweden

[21] Appl. No.: 2,387

[22] Filed: Jan. 11, 1993

[30] Foreign Application Priority Data

Jan. 23, 1992 [GB] United Kingdom ............... 9201406

[51] Int. Cl.⁶ .................................................. B60R 21/16
[52] U.S. Cl. ................ 428/120; 280/727; 280/728.3; 280/731; 280/732; 280/743.1; 428/161; 428/167; 428/212; 428/213; 428/217; 428/438; 428/520; 428/522
[58] Field of Search ...................... 428/119, 120, 428/167, 212, 213, 217, 483, 161, 163, 520, 522, 99; 280/728 B, 731, 732, 743, 727

[56] References Cited

U.S. PATENT DOCUMENTS 4,698,245  10/1987  Schallmeier ................ 428/163
5,100,647  5/1992   Sawada ...................... 280/728 B
5,172,931  12/1992  Baba ......................... 280/728 B

FOREIGN PATENT DOCUMENTS 3942694  6/1990   Germany.
4300965  7/1993   Germany ................. 280/728 B
2228719  9/1990   United Kingdom.
2236082  3/1991   United Kingdom.
2244243  11/1991  United Kingdom.

Primary Examiner—Nasser Ahmad
Attorney, Agent, or Firm—Spencer, Frank & Schneider; Christopher H. Lynt

[57] ABSTRACT

A cover for an air-bag installation includes two superimposed layers of polymer material, each layer carrying complementary flanges or fingers, the flanges or fingers of the layers being inter-digitated, leaving no air space between the flanges or fingers.

7 Claims, 1 Drawing Sheet

5,470,634

COVER FOR AIR-BAG INSTALLATION

BACKGROUND OF THE INVENTION

1. Field of the Invention

The present invention relates to a cover for an air bag installation.

2. Description of the Related Art

It is now common to provide, within a vehicle such as a motor car, air bags located in front of the driver and passenger, the air bags being adapted to inflate in the event that an accident arises.

Typically an air bag is retained within an installation which defines a cavity containing the folded air bag with the cavity having a cover.

Various designs of covers have been proposed previously, including a cover which comprises an inner relatively stiff base layer moulded from a plastic material and an outer softer layer, defining the outer surface of the cover, being formed of a different polymer. In such a case, it is preferred that the base layer is initially moulded, and the base layer is then introduced into a further mould where the soft polymer is moulded into position on the base. It is preferred to utilise thermoplastic polymers for both the base layer and the outer layer. An arrangement of this type is described in DE-A-394264.

It is to be appreciated that for aesthetic reasons it may be desired to give the outer surface of the cover a certain shape, and for practical reasons the inner surface of the base layer must have a specific configuration, and as a consequence the total thickness of the cover may well have to vary from point to point in the cover.

Where the thickness of the cover varies it is an obvious design expedient to provide at least one of the two layers with a variable thickness. However, if the thickness of the material in either of the layers becomes relatively great, a problem may well arise with shrinkage on solidification, since typical shrinkage is about 1.5%. Also, of course, with increasing thickness of either layer solidification at the end of the moulding process will take a longer time, leading to a slower moulding rate.

SUMMARY OF THE INVENTION

According to this invention there is provided a cover for an air bag installation, the cover comprising two superimposed layers of polymer material, wherein each layer carries complementary flanges or fingers, the flanges or fingers of the layers being inter-digitated, leaving no air space between the flanges or the fingers.

Preferably said layers are made of thermoplastic material.

Conveniently the cover comprises a base layer which is relatively stiff and hard, and an outer layer which is relatively soft.

Advantageously the base layer is made of a thermoplastic elastomer.

Preferably the base layer is of polyester.

Conveniently the outer layer is block copolymer or polyester.

Preferably the outer layer is of styrene-ethyl-butyl-styrene.

Conveniently the polymer layers carry the flanges in only part of the cover.

Preferably wherein each layer comprises a sheet of substantially constant thickness, the flanges extending from the sheet of substantially constant thickness and the flanges themselves having a thickness substantially equal to the thickness of the sheet.

BRIEF DESCRIPTION OF THE DRAWINGS

In order that the invention may be more readily understood and so that further features thereof may be appreciated, the invention will now be described, by way of example, with reference to the accompanying drawings in which.

DESCRIPTION OF THE PREFERRED EMBODIMENT

Figure 1:
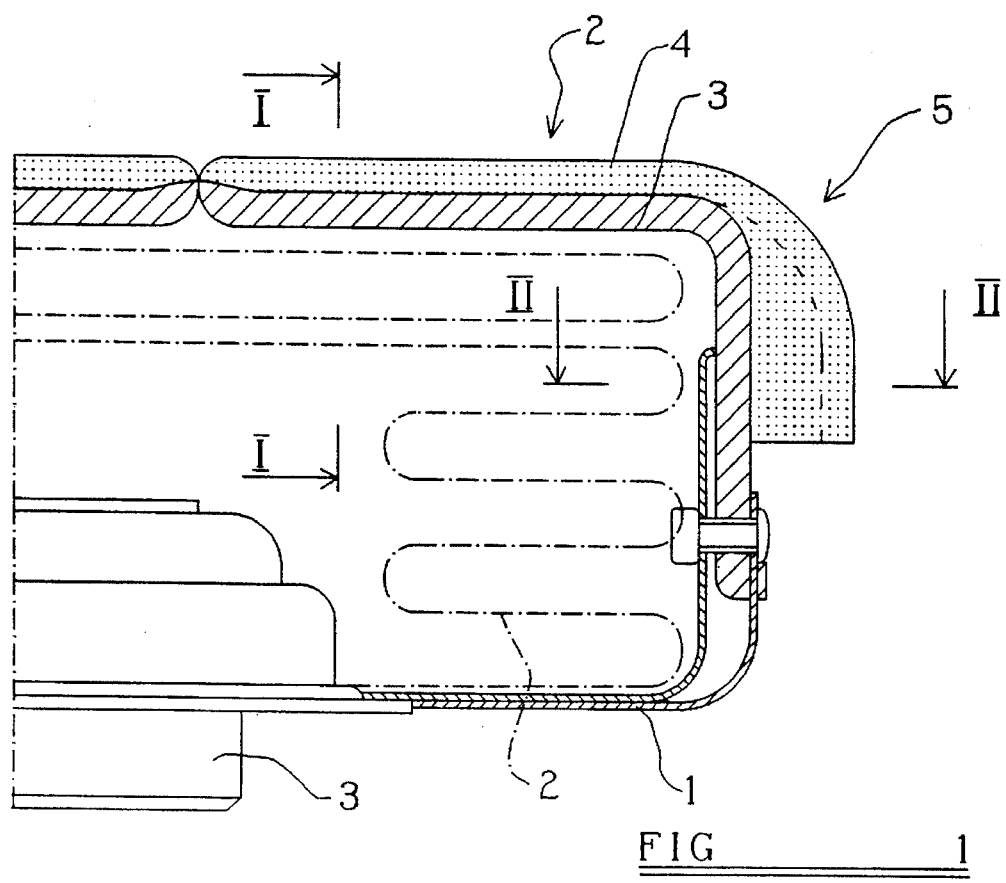
FIG. 1 is a vertical sectional view through an air bag installation provided with a cover in accordance with the invention.

Referring to the drawings, an installation for an air bag comprises a lower housing 1 containing an air bag 2 which is provided with an igniter 3 containing a pyrotechnic charge adapted to inflate the bag.

The installation is provided with a cover 2 which is formed of two superimposed layers or sheets. The lower base layer 8 is relatively hard and stiff and is typically formed from a thermoplastic elastomer, for example of the polyester type. The outer layer 4 is of a softer thermoplastic material than the base layer 8, to provide a degree of comfort, and may be made of a block copolymer such as a styrene-ethyl-butyl-styrene copolymer.

Figure 2:
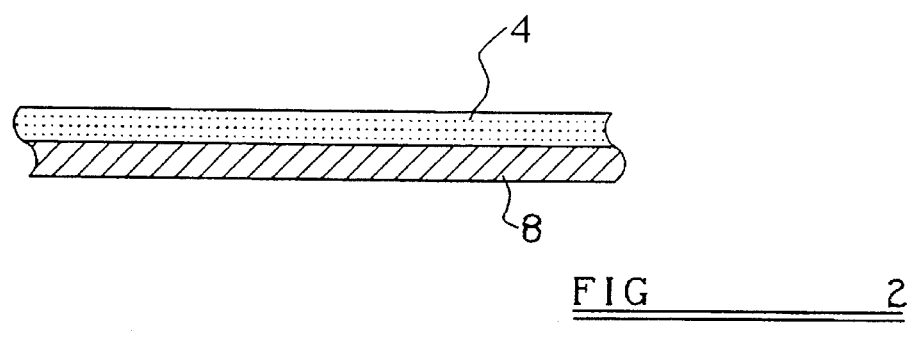
FIG. 2 is a sectional view taken on the line A—A of FIG. 1.

In the region in the top pan of the cover, as can be seen from the sectional view of FIG. 2, the base layer 8 has substantially the same thickness as the thickness of the outer layer 4.

However, towards the side of the cover, in the region indicated by the arrow 5, it can be seen that the overall thickness of the cover increases significantly. In this region, as can be seen from FIG. 3, the base layer 8 is provided with a plurality of substantially evenly spaced outwardly directed parallel flanges or fingers 6.

The part of the base layer carrying the fingers or flanges 6 comprises a sheet which has a thickness substantially equal to the thickness of the main part of the base layer forming the top part of the cover as shown in the sectional view of FIG. 2.

As will be readily understood, the outer layer of flexible polymer defines corresponding parallel flanges or fingers 7 which extend between the flanges or fingers 6 on the layer 8. Thus, the flanges or fingers or the two layers are totally inter-digitated, leaving, no air space.

Figure 3:
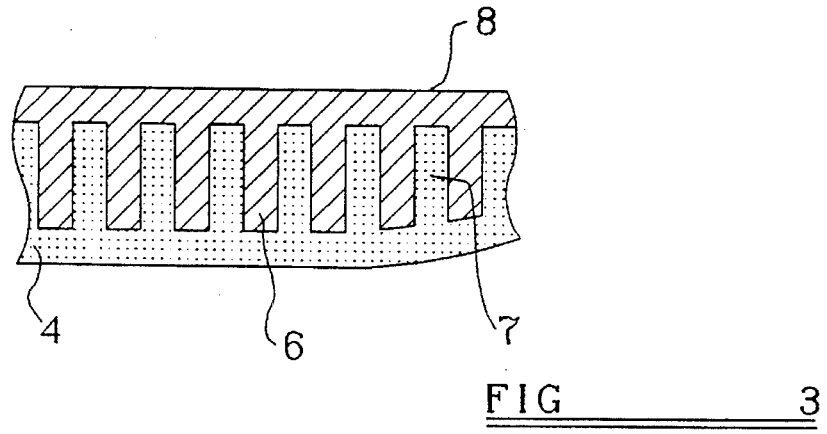
FIG. 3 is a sectional view taken on the line B—B of FIG. 1.

As can be appreciated from FIG. 3 the outer layer 4 can be considered as comprising an outer portion having a thickness substantially equal to the thickness of the outer layer 4 at the top pan of the cover, as illustrated in FIG. 2, which supports the flanges or fingers 7 which are inter-digitated with the flanges or fingers 6 carried by the base layer 8.

The thickness of each flange or fingers 6 or 7 is substantially equal to the portion of the base layer 8 or the outer layer 4 that is supporting the flanges or fingers. Thus, during each moulding process, the flanged region of the cover will cool at the same rate as the non-flanged region. This leads to a realistic moulding rate being accomplished.

The features disclosed in the foregoing description, or the following claims, or the accompanying drawings, expressed in their specific forms or in the terms or means for performing the desired function, or a method or process for attaining the disclosed result, may, separately or in any combination of such features, be utilised for realising the invention in diverse forms thereof.

We claim:

1. A cover for an inflatable air-bag installation, the cover comprising:

a base layer of polymer material, the base layer having a first thickness in first and second regions of the base layer, the first region of the base layer being in a center area of the base layer and the second region of the base layer being in a side area of the base layer, the first thickness being substantially constant, and the base layer having a plurality of evenly spaced flanges in the second region of the base layer, each flange of the base layer having a thickness which is substantially equal to the first thickness each of said flanges extending outwardly from the base layer; and an outer layer of polymer material superimposed on the base layer, the outer layer having a second thickness in first and second regions of the outer layer, the first region of the outer layer being in a center area of the outer layer and the second region of the outer layer being in a side area of the outer layer, the second thickness being substantially constant, the first and second regions of the outer layer corresponding to the first and second regions of the base layer, respectively, and the outer layer having a plurality of evenly spaced flanges in the second region of the outer layer each of said flanges extending outwardly from the outer layer, the flanges of the outer layer being complementary to the flanges of the base layer and each flange of the outer layer having a thickness which is substantially equal to the second thickness, the flanges of the base layer and the outer layer being inter-digitated in the second region of the base and outer layers, leaving no air space between the inter-digitated flanges, a thickness of the cover being substantially equal to the first thickness plus the second thickness in the first regions of the superimposed base and outer layers, and a thickness of the cover being substantially equal to the first thickness plus the second thickness plus a length of the complementary inter-digitated flanges in the second regions of the base and outer layers.

2. The cover according to claim 1, wherein the base and outer layers are made of thermoplastic material.

3. The cover according to claim 1, wherein the base layer has a stiffness and a hardness which are greater than a stiffness and a hardness of the outer layer.

4. The cover according to claim 3, wherein the base layer is made of a thermoplastic elastomer.

5. The cover according to claim 4, wherein the base layer is made of polyester.

6. The cover according to claim 3, wherein the outer layer is a copolymer or polyester.

7. The cover according to claim 6, wherein the outer layer is made of styrene-ethyl-butyl-styrene.

* * * * *